US012691976B2

(12) United States Patent (10) Patent No.: US 12,691,976 B2
Ji (45) Date of Patent: Jul. 28, 2026

(54) MULTI-SOURCE WITH INLINE OFFSET AND METHOD

(71) Applicant: CGG SERVICES SAS, Massy Cedex (FR)

(72) Inventor: Shuo Ji, Katy, TX (US)

(73) Assignee: CGG SERVICES SAS, Massy Cedex (FR)

( * ) Notice: Subject to any disclaimer, the term of this patent is extended or adjusted under 35 U.S.C. 154(b) by 256 days.

(21) Appl. No.: 18/426,534

(22) Filed: Jan. 30, 2024

(65) Prior Publication Data

US 2025/0242892 A1 Jul. 31, 2025

(51) Int. Cl.
*B63B 21/66* (2006.01)
*G01V 1/38* (2006.01)

(52) U.S. Cl.
CPC ............ *B63B 21/66* (2013.01); *G01V 1/3808* (2013.01); *G01V 1/3861* (2013.01)

(58) Field of Classification Search
CPC ..... B63B 21/66; G01V 1/3808; G01V 1/3861
See application file for complete search history.

(56) References Cited

U.S. PATENT DOCUMENTS

2007/0223307 A1* 9/2007 Storteig .............. G01V 1/3861
367/16
2011/0002193 A1 1/2011 Storteig et al.
2017/0075011 A1* 3/2017 Ni ........................ G01V 1/3808

FOREIGN PATENT DOCUMENTS

CN 116413811 A 7/2023
EP 3101451 A1 12/2016

OTHER PUBLICATIONS

Search/Examination Report dated Jul. 14, 2025 in related/corresponding GB Application No. 25011503.

* cited by examiner

Primary Examiner — Krystine E Breier
(74) *Attorney, Agent, or Firm* — PATENT PORTFOLIO BUILDERS PLLC

(57) ABSTRACT

A multi-source for generating seismic waves includes plural source arrays, each source array being configured to generate seismic waves in water, and each source array being configured to be attached to a same towing vessel and plural umbilicals, each connecting a corresponding source array to the towing vessel. Each umbilical has a different length from the other umbilicals of the plural umbilicals when the plural source arrays are deployed in water so that an inline offset increment DX between any two adjacent source arrays, along an inline direction, is non-zero.

12 Claims, 9 Drawing Sheets

MULTI-SOURCE WITH INLINE OFFSET AND METHOD

BACKGROUND

Technical Field

Embodiments of the subject matter disclosed herein generally relate to collecting seismic data during a marine survey with a multi-source and, more particularly, to offsetting source arrays forming the multi-source, along an inline direction, according to a predetermined arrangement, so that a desired clean record length is obtained for a given vessel speed.

Discussion of the Background

Developing offshore oil and gas production fields has found renewed interest in recent years. Due to the high cost of offshore drilling, those undertaking it rely heavily on marine seismic surveys and other geological investigations for surveying the subsurface before selecting drilling locations so as to minimize the risk of a dry well. For mature fields, those studies can help reduce risk in field development, improve the production strategy, and optimize reservoir management decision making procedure. In addition, the marine seismic surveys may be used for determining subfloor locations for carbon capture and sequestration (which may be linked to the oil and gas development operations), estimate potential of geothermal reserves, and/or identify/estimate the presence/absence of other subsurface resources as minerals. Marine surveys generate profiles (images) of the geophysical structure under the seafloor by acquiring seismic data with plural sensors towed with streamers or ocean bottom nodes (OBN) distributed above the subsurface of interest, and then processing the acquired seismic data to generate an image of the subsurface. While these profiles do not provide an accurate location of oil and gas reservoirs, those trained in the field may use them to estimate the presence or absence of oil and/or gas.

A marine seismic survey may be performed using the marine seismic survey system 100 illustrated in FIG. 1 (bird's-eye view). A vessel 110 tows through the water a multi-source 120 that includes two seismic source arrays 122 and 124 and corresponding umbilicals. Each seismic source array 122, 124 typically includes plural sub-arrays 123, 125, respectively. A sub-array includes plural air guns configured to generate seismic waves. Other type of sound generating devices may be used instead of the air guns, for example, a vibratory source. The seismic waves propagate downward into the geophysical structure to be surveyed, under the seafloor, and are reflected upward from interfaces between geological layers. Seismic sensors (not shown), either embedded in seismic streamers that may be towed by the same vessel 110 or another vessel, or OBNs distributed on sea floor, detect the reflected waves. Data related to the reflected waves is recorded and processed to provide information about the underlying geological features.

Each sub-array 123, 125 of the source arrays 122, 124 (a source array typically has 2 or 3 sub-arrays) is connected to the vessel 110 by a corresponding umbilical cable 126. An umbilical cable is used in the industry to describe the cables that are used to tow the sub-arrays (also known as gun strings) through the water from a vessel. The umbilical cables 126 are stored on large winches 128 (only one is shown in FIG. 1 for simplicity) within the seismic vessel 110, usually on the source handling deck, which is at the rear of the vessel and close to the water line. Electronics and a compressed air conduit enter the umbilical lines and reach each air gun. Once the gun strings are in the water, the umbilical cable is under tension due to the resistance of the gun string being towed through the water and can be deployed or retrieved by rotating the umbilical winch as well as due to the dragging force experienced by umbilical. Thus, a unique length L of the umbilical 126, between the vessel 110 and each source array 122, 124, can be selected for each survey, depending on the subsurface features.

For a typical 3D vessel towing 12 streamers, each sub-array is deployed at a constant distance L=500 m behind the vessel. Once deployed, the distance L is kept unchanged. For source vessels where no streamers are used, the source arrays 122, 124 are typically towed 150 to 200 m behind the vessel. The crossline distance CD (along the Y direction in the figure) between the source arrays is maintained by small deflectors (not shown) often towed on one or both sides of the sources or by steering devices as part of the gun strings. Individual sub-arrays 123 making up a source array 122, 124 are typically towed between 8 to 10 m apart in the crossline direction. The crossline distance CD between the centers (C1, C2) of the full source arrays can range from 25 m to over 500 m for ultra-wide tow setups. In recent years, there has been a push to tow wider sources to limit the distance from the center of source to the outer streamer cables or achieve greater efficiencies.

For a traditional three dimensional (3D) offshore seismic survey multi-source (dual-source and/or triple-source configuration) used for seismic data acquisition, each of the source arrays has the same inline distance L from the source vessel. This remains true for other seismic multi-source settings in marine survey (quad-source, penta-source, hexa-source, or deca-source), i.e., the inline distance between the seismic source arrays (center of source array) and source vessels are substantially equal.

This configuration poses certain problems when a clean record length is desired to be maintained. In this regard, the clean record length is one constraint, which is usually chosen to make sure that for a recorded shot N, the time interval corresponding to prospects/reservoirs is free of energy from the N+1 shot. For a given fix shot interval along the shooting direction (the inline direction), the clean record length is inversely proportional to the source vessel speed. In seismic acquisition, due to hardware limitations, the source vessel speed is selected to be between about 3.8 and 5 knots (7.4 to 9.7 m/s). At the same time, the source side efficiency is proportional to the vessel speed. For simplicity, in this disclosure, the water bottom vessel speed (speed over ground) is considered to be the same as the vessel speed through water (STW).

A problem with the existing configurations is that for the typical regular source grid (i.e., locations where the individual air guns of the source arrays need to be shot) used with a multi-source, it does not respect the clean record length, or it requires a slower speed for the source vessel, which is not desired. Thus, there is a need for a new source configuration that does not change the traditional speeds used for seismic surveying, and also achieves the clean record length for the given source grid.

SUMMARY

According to an embodiment, a multi-source for generating seismic waves includes plural source arrays, each source array being configured to generate seismic waves in water, and each source array being configured to be attached to a same towing vessel, and plural umbilicals, each connecting a corresponding source array to the towing vessel. Each umbilical has a different length from the other umbilicals of the plural umbilicals when the plural source arrays are deployed in water so that an inline offset increment DX between any two adjacent source arrays, along an inline direction, is constant and given by DX=ISI/n, where ISI is an inline shot spacing and n is the number of source arrays of the multi-source.

According to another embodiment, a multi-source for generating seismic waves includes plural source arrays, each source array being configured to generate seismic waves in water, and each source array being configured to be attached to a same towing vessel, and plural umbilicals, each connecting a corresponding source array to the towing vessel. Each umbilical has a different length from the other umbilicals of the plural umbilicals when the plural source arrays are deployed in water so that an inline offset increment DX between any two adjacent source arrays, along an inline direction, varies no more than 10% around a value of ISI/n, where ISI is the inline shot spacing and n is the number of source arrays of the multi-source.

According to still another embodiment, a multi-source for generating seismic waves includes plural source arrays, each source array being configured to generate seismic waves in water, and each source array being configured to be attached to a same towing vessel and plural umbilicals, each connecting a corresponding source array to the towing vessel. Each umbilical has a different length from the other umbilicals of the plural umbilicals when the plural source arrays are deployed in water so that an inline offset increment DX between any two adjacent source arrays, along an inline direction, varies based on a function f.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine seismic survey system that uses a multi-source including three source arrays (triple-source setting) offset from each other, with umbilicals, along the inline direction. However, the embodiments to be discussed next are not limited to three source arrays (triple-source setting), but may be applied to more or less source arrays.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a multi-source that includes plural source arrays, and each source array is offset from a next source array with a given offset increment DX along an inline direction. In one application, the multi-source also includes the corresponding umbilicals. Typically, the inline direction is the travelling direction of the vessel, and a crossline direction is a direction perpendicular on the inline direction. In one application, the offset increment DX is constant for the entire multi-source. In another application, the offset increment DX changes from one source array to the next one. In yet another application, the offset increment DX varies from one source array to the next one, according, for example, to a function. All these variations are now discussed with regard to the figures.

Figure 2:
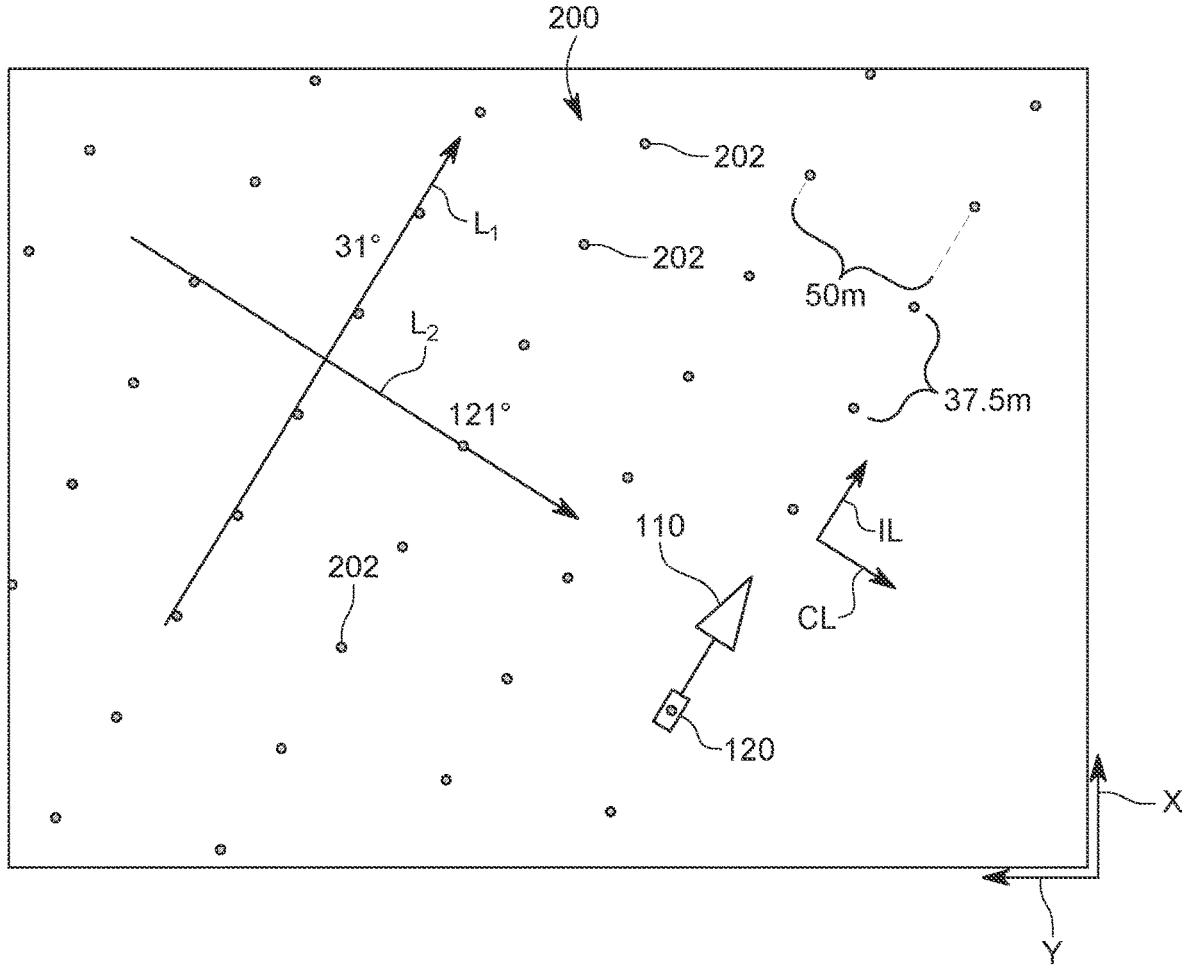
FIG. 2 illustrates a source grid and a vessel towing a single source array for shooting at various shooting points of the source grid, with a first azimuth.

FIG. 2 illustrates a regular source grid 200 of an OBN survey which is used to demonstrate the advantage of the multi-source with inline offset. For this analysis, it is assumed that a clean record length of 12 s is implemented. This means that after a source array is shot and the reflected signals are first recorded by the seismic sensors, no other source array can fire for a certain time so that the seismic sensors record signals for 12 s only from the shot source array during this time. However, at the end of the 12 s, seismic waves from a next source array are expected to arrive. FIG. 2 shows the source grid 200 including plural shot points 202 extending along lines L1 and L2, which have an azimuth of 31° and 121°, respectively, relative to the cartesian axes X (clockwise) and Y. A source or multi-source 120 that is towed by vessel 110 in FIG. 2 needs to be positioned at each shot point 202 for being fired. One way to achieve this, is for the vessel 110 to advance along the inline direction IL (cross line direction CL is also shown in the figure, perpendicular to the IL), which is parallel to line L1. With this arrangement, the vessel 110 with a single source array 122 needs to move along each line L1 and shoots the source array every 37.5 m to cover all the shot points 202. This arrangement is very inefficient because a long time (14.6 s at 5 knots) is necessary for a single source array to reach all the shot points.

Figure 3:
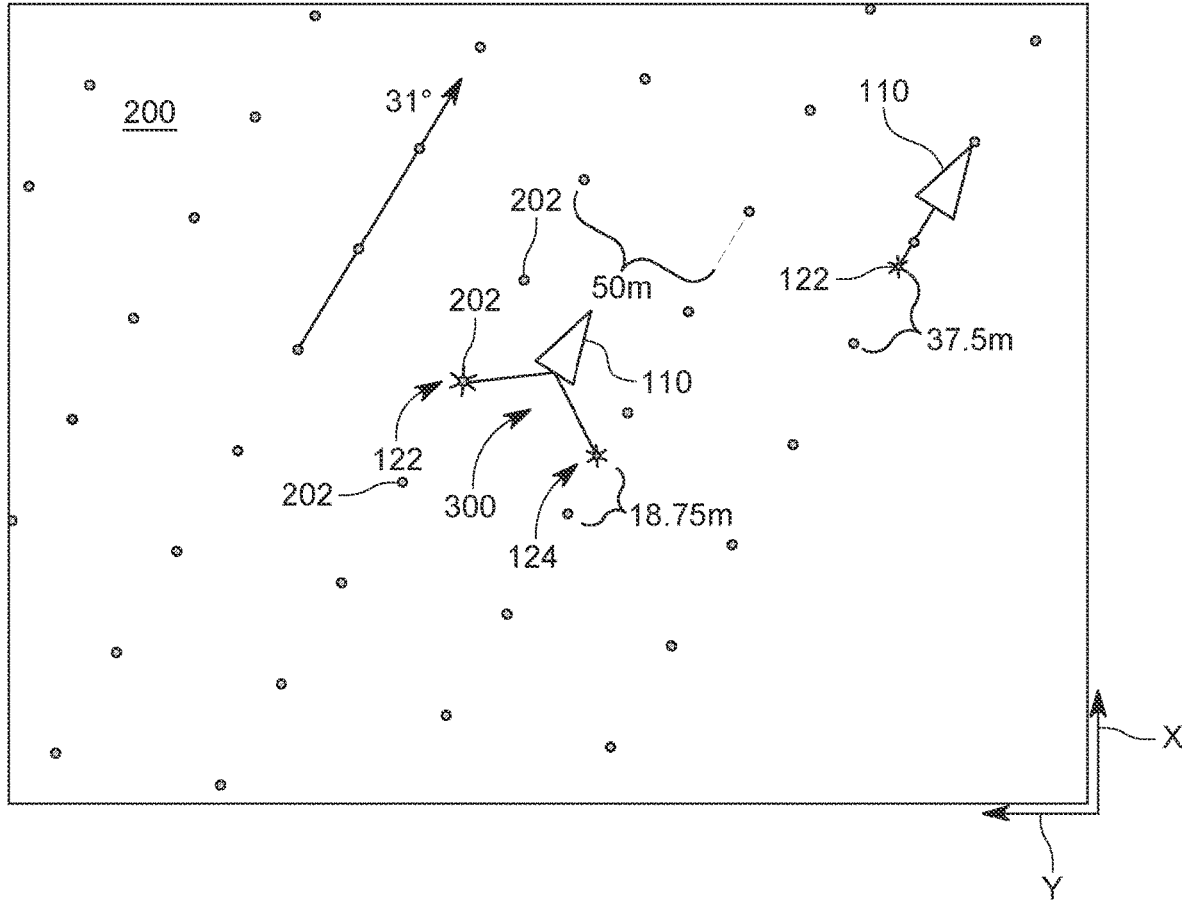
FIG. 3 illustrates the source grid and a vessel towing a single source array and a vessel towing a dual-source for shooting at the various shooting points of the source grid, along the first azimuth.

For the given shot grid 200, a dual-source configuration is shown in FIG. 3 along shooting azimuth 31°. With a dual-source setting 300, the staggered shot points lead to 18.75 m shot point interval, and a vessel speed of about 3 knots is needed to meet the 12 s clean record length, which is outside the preferred vessel speed range.

Figure 4:
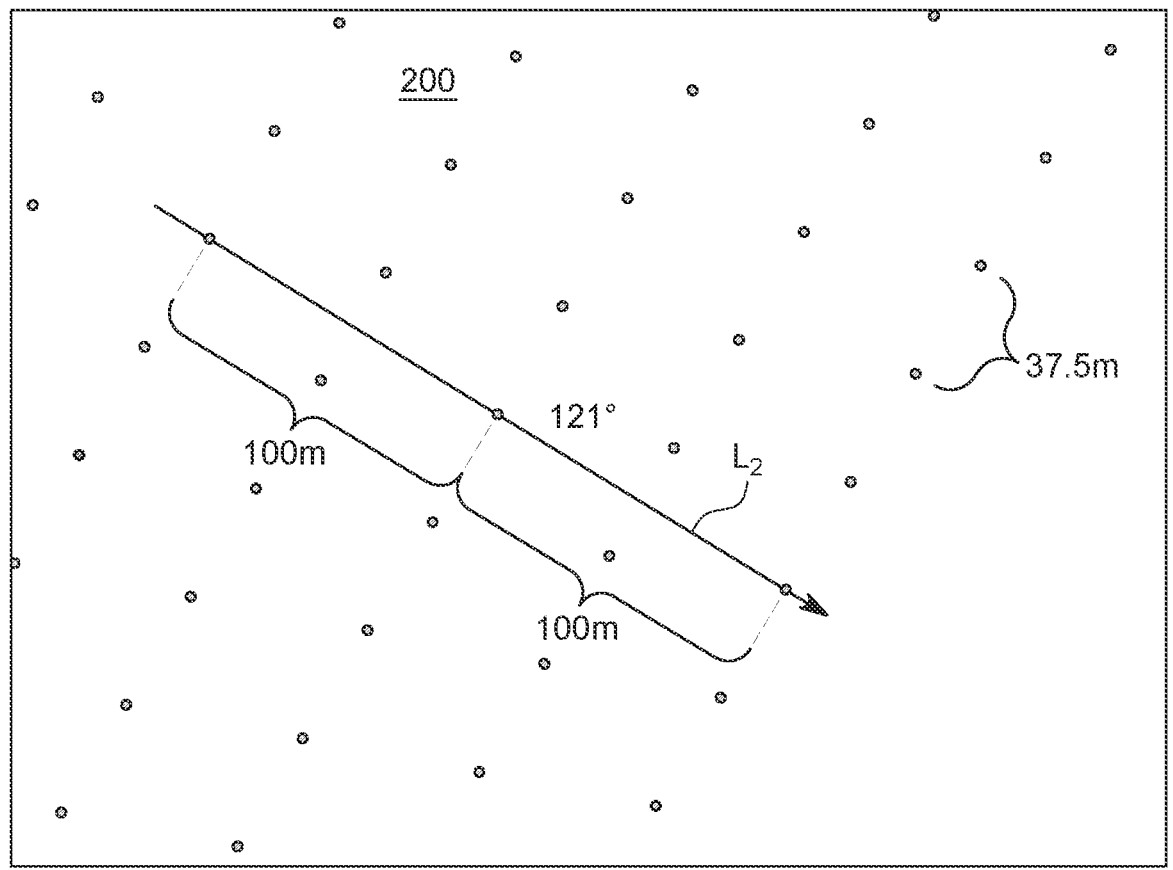
FIG. 4 illustrates the source grid and how the various shooting points of the source grid are to be reached by a source moving along a second azimuth.

If the shooting azimuth 31° is not optimal for production (due to reasons like nearby simultaneous seismic operations, other marine activities, etc.), shooting azimuth 121° could be an alternative. FIG. 4 shows that a source array being towed along line L2 will have a shot interval of 100 m. For a single vessel single source, at 5 knots, the clean record length will be about 39 s, which is too long, more than 3 times of the required 12 s, leading to too low acquisition efficiency. Thus, a triple-source setting should provide about 13 s clean record length at 5 knots.

Figure 5:
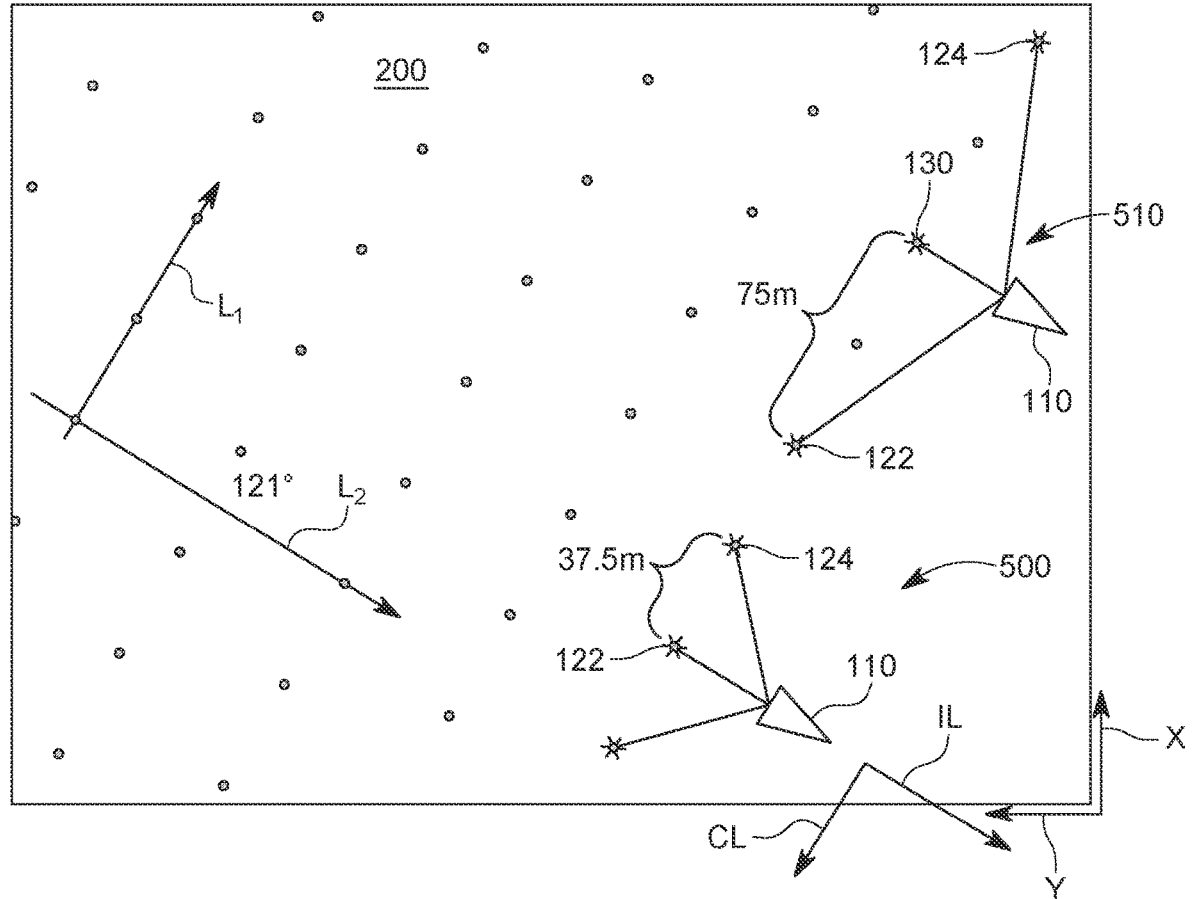
FIG. 5 illustrates multi-sources moving along the second azimuth to shoot the shooting points of the source grid.

FIG. 5 shows two possible triple-source settings, one setting 500 with CL source array separation of 37.5 m and another setting 510 with 75 m CL separation between adjacent source arrays. The issue for these settings is the following: the shot locations are aligned along the L1 direction (in this case, 31°). Under the triple-source setting 510, all three source arrays will arrive at their target source location at the same time, so there will be no time gap between those three sources' firing time. The seismic sensors will receive fully blended seismic energy from the three source arrays, with zero clean record length. The same problem is encountered by the two source arrays setting 500.

Figure 6A:
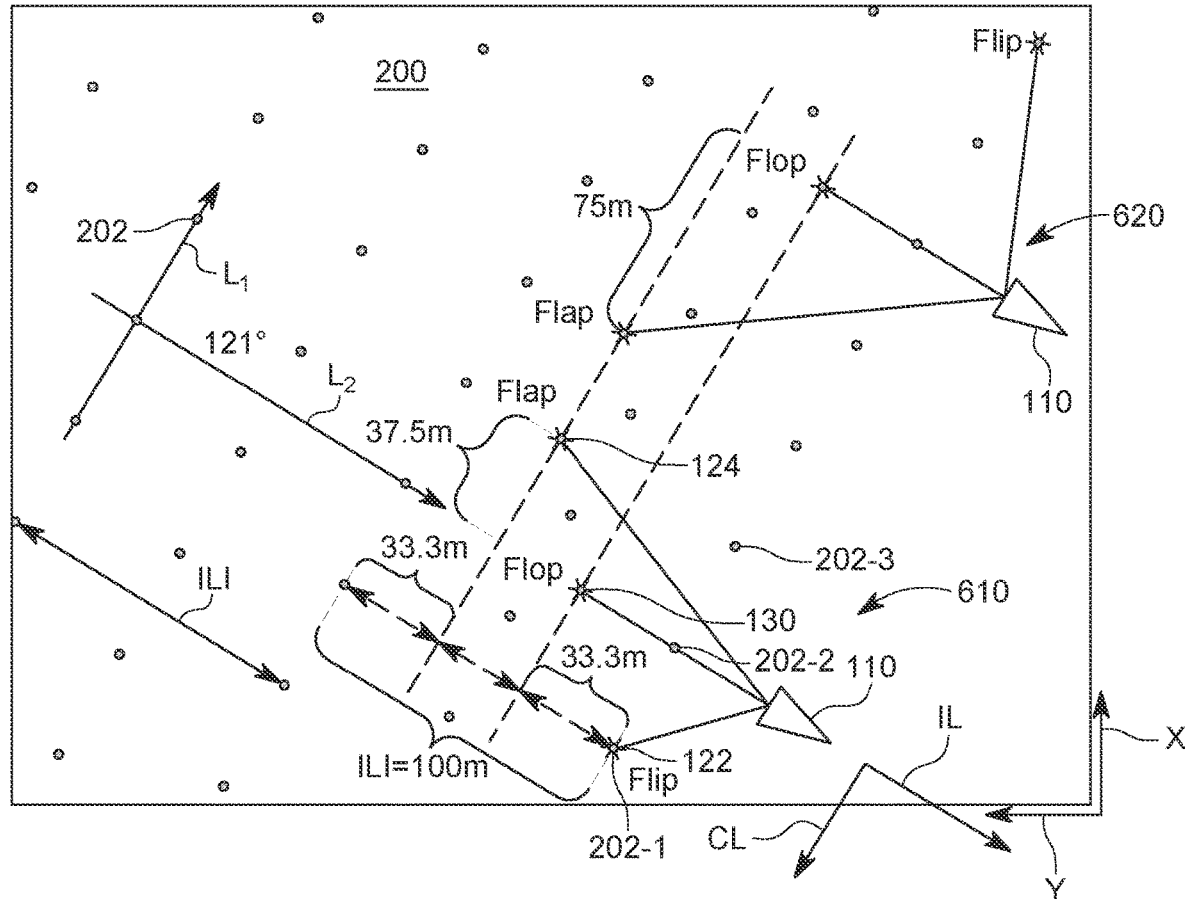
FIGS. 6A and 6B illustrate a vessel towing a multi-source with each source array being offset along an inline direction relative to the other source arrays and shooting at the source grid.
Figure 6B:
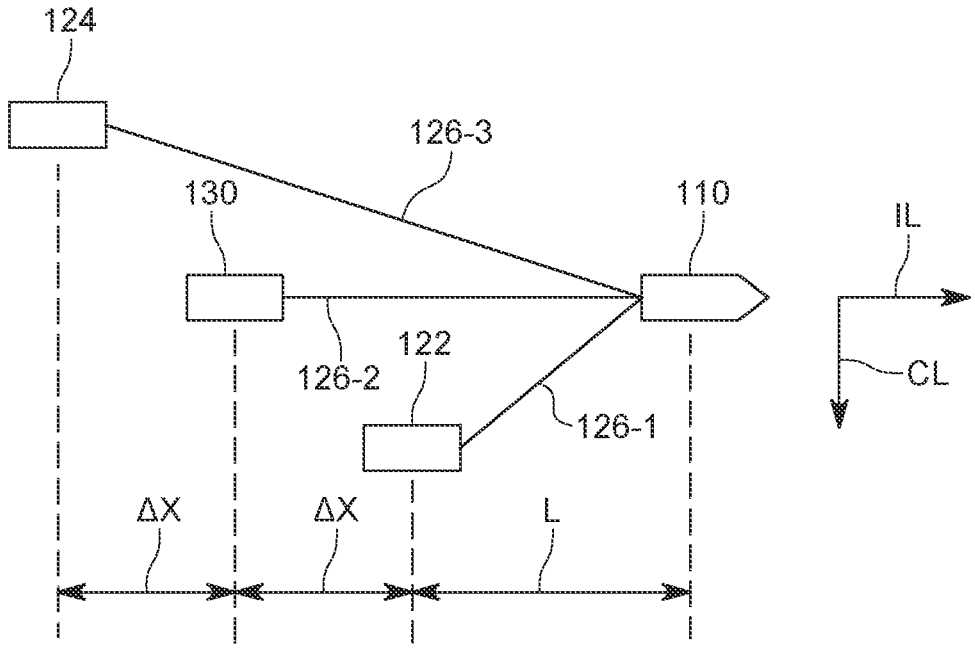

To address the above noted problems with the traditional single and multi-sources, a new multi-source setting is introduced as illustrated in FIGS. 6A and 6B. Note that the source grid 200 discussed above is maintained, i.e., the shot locations 202 for the source arrays are still arranged along the lines L1 and L2 introduced in FIG. 2. The inline direction IL is aligned with the line L2, i.e., makes an azimuth angle of 121° with the X direction. The new multi-source setting is exemplified in FIG. 6A with a vessel 110 towing three source arrays. However, the new multi-source setting, as explained next, is applicable to any number n of source arrays.

The first setting 610 shown in FIG. 6A has the source arrays separated along the cross-line direction by a first distance (37.5 m) while the second setting 620 has the source arrays separated by a second distance (75 m), larger than the first distance (for example, double the first distance). The IL offset increment between the adjacent sources (adjacent along the cross-line direction) is considered to be DX. For a given source vessel, comparing to a conventional multi-source setting where multiple source arrays are aligned along the cross-line direction (i.e., same IL distance between the source arrays and the source vessel), different IL offsets have been introduced in configurations 610 and 620 for different source arrays, so the IL distances between the source arrays and the source vessel are non-equal.

According to one embodiment, the IL offset increment DX may be a constant, i.e., is the same between the first and second source arrays and between the second and third source arrays for the three-source shown in FIG. 6A. FIG. 6B illustrates this situation. If the inline offset increment DX is constant, it may be calculated based on the formula DX=ISI/n, where ISI is the shot spacing for each individual source along the IL direction (100 m for the arrangement 610), and n is number of source arrays per source vessel (2 for dual-source, 3 for triple-source, etc.). If ISI is 100 m and n=3 as schematically illustrated in FIG. 6A, then the inline offset increment DX is 33.3 m. For this arrangement, the first source array 122 is shot at location 202-1, the second source array 130 is shot at location 202-2, and the third source array 124 is shot at location 202-3 in a flip-flop-flap sequence. In this way, the vessel and implicitly each source array travel a distance DX before a next source array is fired after a previous source array has been fired. For the flip-flop-flap sequence, a 33 m DX with 5 knots vessel speed leads to a clean record length of about 13 s, for both of the 610 and 620 configurations. FIG. 6A shows that either the port side or the starboard side source array may be closer to the vessel 110 along the inline direction IL. In one application, in which all the sources have different IL offset values, it is possible that the middle source array is the closest to the vessel along the inline direction, and the IL offset increment between the adjacent firing sources is constant.

Figure 1:
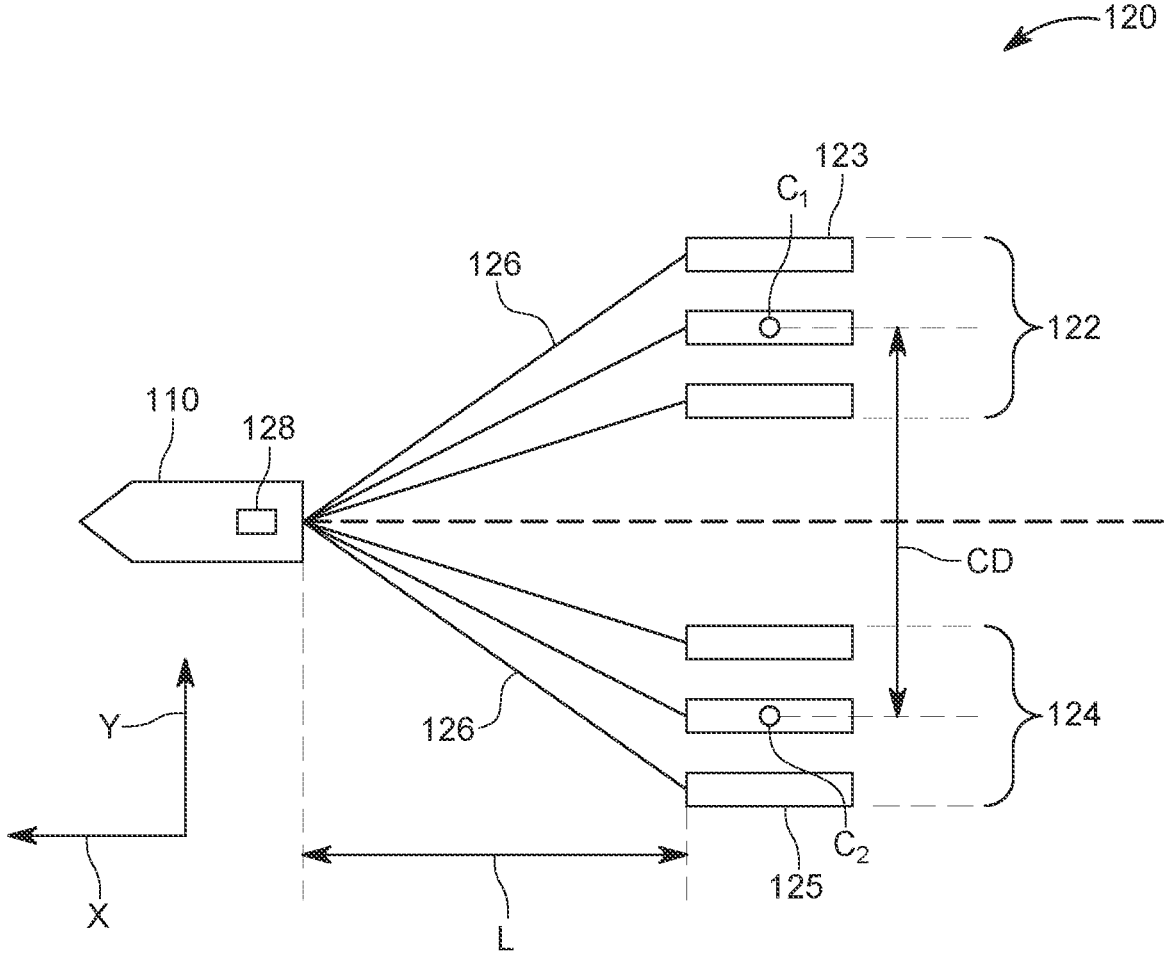
FIG. 1 illustrates a marine survey system in which a vessel tows seismic source arrays (dual-source setting) with umbilical cables.

The inline offset increment DX may be implemented by adjusting the lengths of the umbilical 126 with the corresponding winches 128 discussed above with regard to FIG. 1. In this regard, FIG. 6B shows that a first umbilical 126-1 connects the first source array 122 to the vessel 110, a second umbilical 126-2 connects the second source array 130 to the vessel, and a third umbilical 126-3 connects the third source array 124 to the vessel. A length of the first umbilical is L along the inline direction IL, the second umbilical is L+DX, and the third umbilical is L+2DX.

Figure 7:
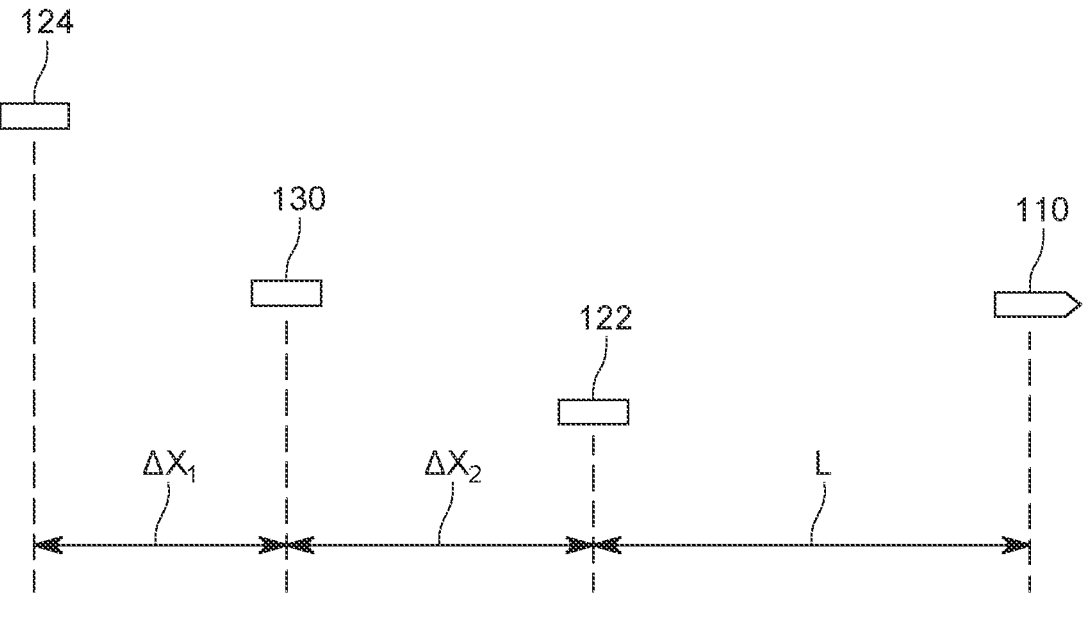
FIG. 7 illustrates locations of the source arrays of a multi-source with different inline offset increments.

In another embodiment, which is schematically illustrated in FIG. 7, the inline offset increment DX could be selected to be non-constant, i.e., it could be slightly modified from the constant value of ISI/n. In this embodiment, the inline offset increment between the source array 124 and source array 130 is DX1 and the inline offset increment between the source array 130 and the source array 122 is DX2, where DX1+DX2=2DX. Each of DX1 and DX2 may vary up to about 10% from DX. In one application, the inline offset increments $DX_k$, where k is an integer smaller than n, may vary in a random manner as long as the sum off all of them equals (n−1)DX, where DX=ICI/n.

In yet another embodiment, the inline offset increment DX could be setup so that out of n consecutive increments that are part of the same ISI, m DX have the same first increment (m is an integer smaller than n) and the remaining n-m have a different second increment. For example, if there are three increments as for the case shown in FIG. 6A, 2 of them have a value of ISI/4, and the remaining increment has a value of ISI/2, or similar variation.

Figure 8:
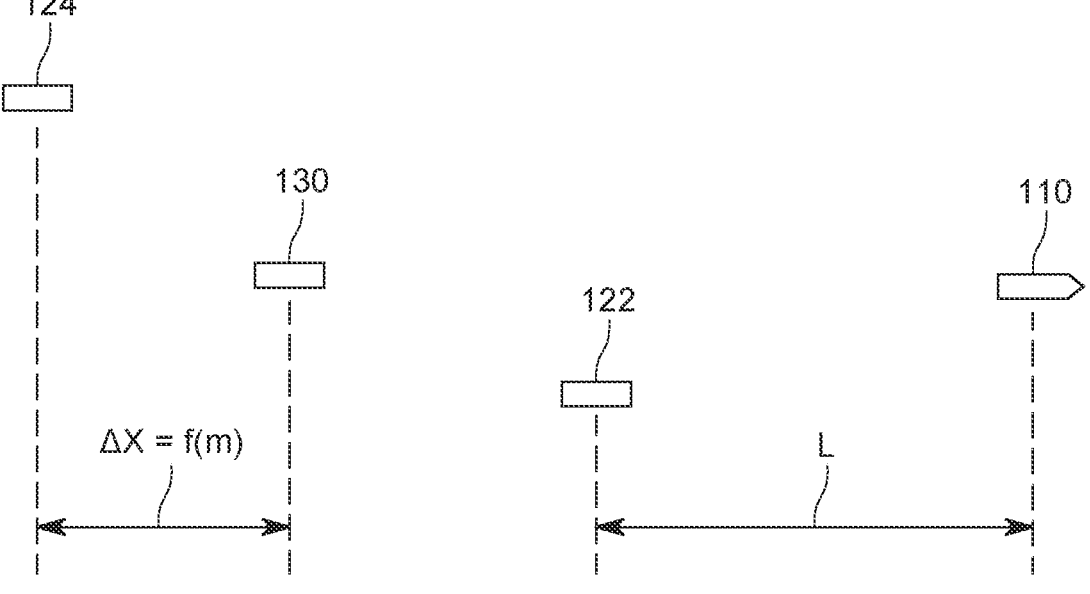
FIG. 8 illustrates locations of the source arrays of the multi-source with varying inline offset increments.

In still another embodiment, which is schematically illustrated in FIG. 8, the IL offset increment DX could be set up to use a polynomial or other function f so that $DX_n$=f(n). In one example, f(n)=c1·n+c2, in another example, f(n)=c1/n+c2, in both cases, c1 and c2 are constants subject to the constraint given by sum $(DX_i)$=ISI. In this case, i could be either based on each source's spatial location along crossline direction, or i could indicate the firing sequence. This means that the IL offset increment may also vary from one source array to the next one, but this time based on the function f. For the source grid 200 shown in FIG. 4, where the target shot locations 202 are aligned in CL direction, the IL offset increment DX between neighboring (in firing sequence) shots and the vessel speed determines the clean record length. Thus, the configuration shown in FIG. 4 is a special case with DX=0, which indicates that the clean record length is 0 s.

Figure 9:
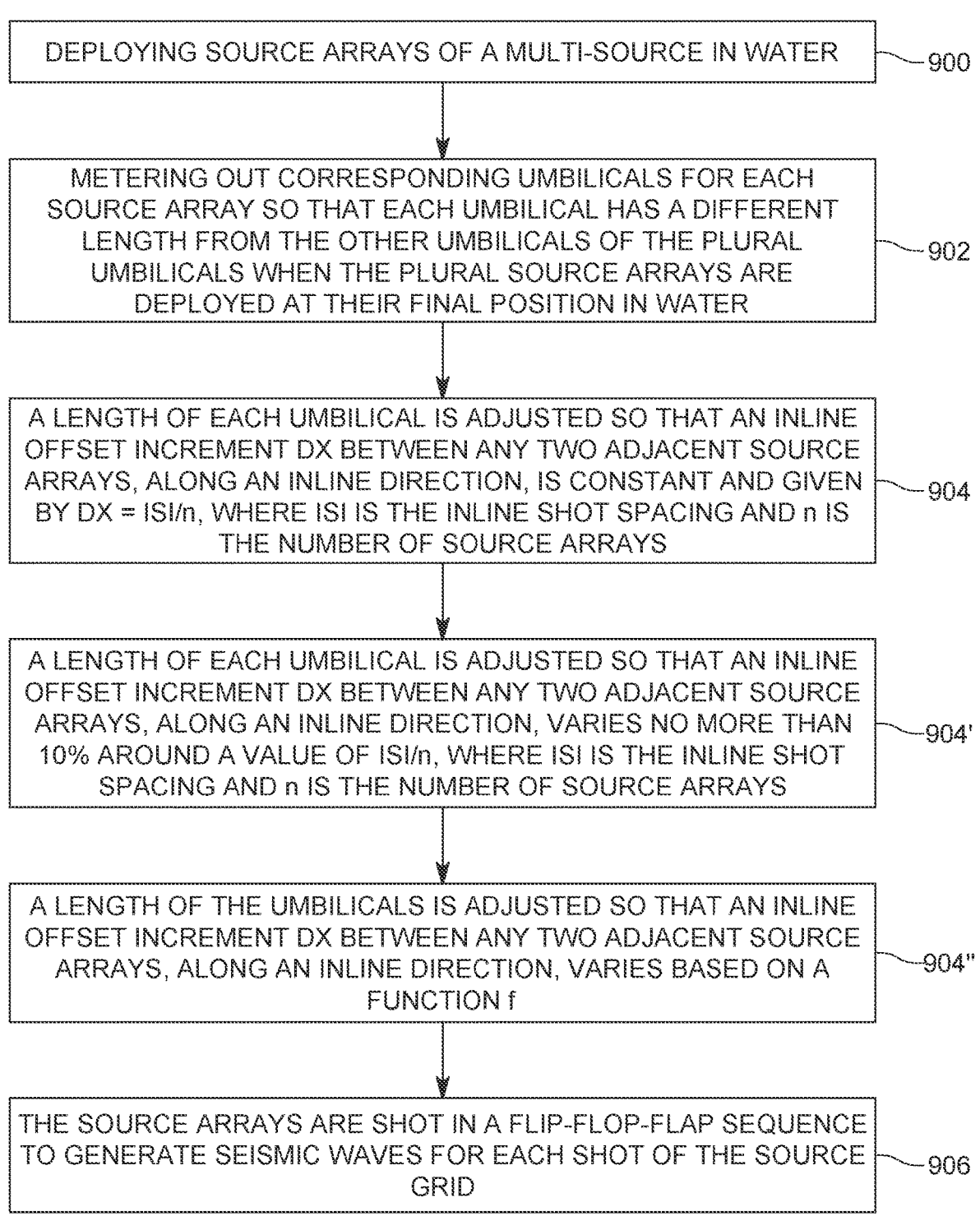
FIG. 9 is a flow chart of a method for shooting a multi-source having source arrays distributed at different locations along an inline direction.

A method for generating seismic waves in water with the multi-source 120 is now discussed with regard to FIG. 9. The method includes a step 900 of deploying the source arrays of the multi-source in water, a step 902 of metering out corresponding umbilicals for each source array. In step 904, a length of each umbilical is adjusted so that an inline offset increment DX between any two adjacent source arrays (in firing sequence, which might correlate with spatial location along crossline direction), along an inline direction, is constant and given by DX=ISI/n, where ISI is the inline shot spacing and n is the number of source arrays.

In an alternative step 904', the length of each umbilical is adjusted so that an inline offset increment DX between any two adjacent source arrays (in firing sequence, which might correlate with spatial location along crossline direction), along an inline direction, varies no more than 10% around a value of ISI/n, where ISI is the inline shot spacing and n is the number of source arrays. In yet another alternative step 904", a length of the umbilicals is adjusted so that an inline offset increment DX between any two adjacent source arrays, along an inline direction, varies based on a function f. Note that any one of steps 904, 904' and 904" may be used. In one application, it is possible to perform a part of the seismic survey with the arrangement of one step of steps 904, 904' and 904" and then, later, to change to another arrangement of another step of steps 904, 904' and 904". Then, in step 906, using triple-source setting as example, the source arrays are shot in a flip-flop-flap sequence (or other possible alternative) to generate seismic waves for each shot of the source grid, with the IL offset increment DX between any two adjacent source arrays along the firing sequence being defined in step 904.

In one embodiment, a processor 630 of the vessel 110 is configured to implement the IL offset increment DX, based on one of the steps 904, 904', and/or 904". In one variation of this embodiment, the processor 630 may be programmed to change the IL offset increment DX from one configuration to another configuration during the seismic survey, e.g., after finishing shooting a line and just before shooting a next line. Thus, the processor 630 is configured in this embodiment to dynamically adjust the IL offset increment DX between one of the steps 604, 604', and 604".

In one application, each source array is configured to shoot at a corresponding shot point in source grid 200 specified in FIG. 2 and no two source arrays shoot at the same instant. In this or another application, each source array includes plural air guns. In one embodiment, the plural source arrays are towed with a speed of about 9.6 km/h, and a crossline separation of 37.5 m or 75 m, so that a clean record length is larger than 12 s. The azimuth of the inline direction is about 121° and the inline shot spacing is about 100 m.

The term "about" is used in this application to mean a variation of up to 20% of the parameter characterized by this term.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide a seismic data acquisition system that generates seismic waves with plural source arrays, which are offset along an inline direction. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A multi-source for generating seismic waves, the multi-source comprising:

plural source arrays, each source array being configured to generate seismic waves in water, and each source array being configured to be attached to a same towing vessel; and plural umbilicals, each connecting a corresponding source array to the towing vessel, wherein each umbilical has a different length from the other umbilicals of the plural umbilicals when the plural source arrays are deployed in water so that an inline offset increment DX between any two adjacent source arrays, along an inline direction, is constant and given by DX=ISI/n, where ISI is an inline shot spacing and n is the number of source arrays of the multi-source.

2. The multi-source of claim 1, wherein each source array includes plural air guns.

3. The multi-source of claim 1, wherein each source array is configured to shoot at a corresponding shot point of a shot grid and no two source arrays shoot at the same instant.

4. The multi-source of claim 1, wherein the plural source arrays are configured to shoot in a flip-flop-flap sequence.

5. The multi-source of claim 1, wherein the plural source arrays are towed with a speed of about 9.6 km/h, and the inline shot spacing is about 100 m, the constant DX is about 33 m when the plural source arrays include three source arrays so that a clean record length is larger than 12 s.

6. The multi-source of claim 1, further comprising:
a processor configured to adjust the inline offset incre-
ment DX.

7. A multi-source for generating seismic waves, the multi-
source comprising:
plural source arrays, each source array being configured to
generate seismic waves in water, and each source array
being configured to be attached to a same towing
vessel; and
plural umbilicals, each connecting a corresponding source
array to the towing vessel,
wherein each umbilical has a different length from the
other umbilicals of the plural umbilicals when the
plural source arrays are deployed in water so that an
inline offset increment DX between any two adjacent
source arrays, along an inline direction, varies no more
than 10% around a value of ISI/n, where ISI is the
inline shot spacing and n is the number of source arrays
of the multi-source.

8. The multi-source of claim 7, wherein each source array
includes plural air guns.

9. The multi-source of claim 7, wherein each source array
is configured to shoot at a corresponding shot point of source
grid and no two source arrays shoot at the same instant.

10. The multi-source of claim 7, wherein the plural source
arrays are configured to shoot in flip-flop-flap sequence.

11. The multi-source of claim 7, wherein the plural source
arrays are towed with a speed of about 9.26 km/h, and the
inline shot spacing is about 100 m, the constant DX is about
33 m for triple-source, and a crossline separation of 37.5 m
or 75 m, so that a clean record length is larger than 12 s.

12. The multi-source of claim 7, further comprising:

a processor configured to adjust the inline offset incre-
ment DX.

* * * * *